UNITED STATES PATENT OFFICE.

KRISTIAN GERHARD DAHL, OF DRAMMEN, NORWAY.

PROCESS OF PRESERVING MILK.

SPECIFICATION forming part of Letters Patent No. 364,579, dated June 7, 1887.

Application filed October 4, 1886. Serial No. 215,255. (No specimens.) Patented in England August 26, 1886, No. 10,903; in France September 14, 1886, No. 178,501; in Belgium September 14, 1886, No. 74,528; in Germany September 14, 1886, No. 39,796; in Canada, October 13, 1886, No. 25,115, and in Austria-Hungary January 23, 1887, No. 36,626.

*To all whom it may concern:*

Be it known that I, KRISTIAN GERHARD DAHL, a subject of the King of Sweden and Norway, residing at Drammen, Norway, have invented certain new and useful Improvements in a Process for Preserving Milk, (for which Letters Patent have been granted in Great Britain, No. 10,903, dated August 26, 1886; in France, No. 178,501, dated September 14, 1886; in Belgium, No. 74,528, dated September 14, 1886; in Germany, No. 39,796, dated September 14, 1886; in Austria-Hungary, No. 36,626, dated January 23, 1887, and in Canada, No. 25,115, dated October 13, 1886;) and I do hereby declare that the following is a full, clear, and exact description of the invention, which will enable others skilled in the art to which it appertains to make and use the same.

Through the researches and experiments of Pasteur and others it has for several years been known that the developed living organisms in milk are destroyed at a much lower temperature than the germs of such organisms.

The object of this invention is to provide means whereby milk may be preserved indefinitely without rendering it unpalatable by treatment at high temperature, without condensing the same, and without mixing therewith a preservative of any kind.

After extensive experiments, extending over a period of several years, I have found that milk can be preserved by treating it at such temperatures as will not render it unpalatable, although these temperatures are not sufficiently high to destroy the germs of the microbe or organisms, yet they are high enough to destroy the living microbes or organisms present.

I have found that I can destroy the living microbes, as well as their germs, by treating the milk under occlusion of atmospheric air by first heating it to that degree that will destroy the living organisms, then lowering the temperature to that point which is most conducive to the development of the germs into living organisms, to be again destroyed as before, and repeating this operation to insure the entire destruction of all the germs contained in the milk, which may then be kept indefinitely, of course under occlusion of atmospheric air, without the admixture therewith of a preservative agent.

The invention therefore consists, essentially, in the process of treating milk under occlusion of atmospheric air at such temperatures as will destroy the living organisms therein, then bringing the milk to a temperature that is most conducive to the development of the germs into living organisms, allowing the milk to stand at such temperature to develop the germs, and then increasing the temperature to destroy the living organisms developed, and repeating this operation once or twice, substantially as hereinafter described, and as set forth in the claims.

The milk as it comes from healthy cows is strained and cooled down at once to about 10° or 15° centigrade in vessels intended for transport from the stable or other place to the factory where the milk is to be treated. In the factory I put the cooled milk into the vessels in which the milk is supplied to the consumer. I prefer to put the cooled milk into small flat or shallow carefully-cleaned "tins" or boxes made of tinned iron and which are only used once; or, I may put the milk into larger vessels, which, when used, are returned empty to the factory for refilling. These larger vessels are by preference square in section, and having two opposite sides bulged in slightly for the purpose of making allowance for expansion caused by increase of temperature. If I use the large vessels, I first carefully clean them and then dry and heat them in a hot-air chamber at about 150° centigrade for about one and one-half hour, which drying may be done the day before the treatment begins, the vessels being kept there till wanted; or they may meanwhile be kept in a place where the air is perfectly pure and cool, and hence free from germs of living organisms.

The aforesaid small or large vessels, having been filled with the cooled milk, are then at once hermetically sealed and exposed to a temperature of about 70° centigrade in a suitable heating-vessel for the space of about one and three-fourths hour, whereby the bacteria contained in the milk are, as I believe, killed. I then cool them down to about 40° centigrade, and keep them at that for about one and three-fourths hour for the purpose of quickly developing the remaining germs, as I believe, whereupon they are quickly heated up to about 70° centigrade for the purpose of killing the developed germs or bacteria, as I believe. I have found it advisable to repeat this operation once or twice. The last heating to 70° should, however, only be for about half an hour. There may then be some remaining organisms which, however, as I believe, are not so much developed as to have formed any germs, and these organisms are killed by raising the temperature to 80° or 100°, which maximum must be kept for about one-half or three-fourths hour. The milk is now, as I believe, free from living bacteria and germs of same. The vessels are then cooled down to 15°, or less.

For the purpose of ascertaining and regulating the temperature with large tins I use a tin of the same size filled with water and fitted with a thermometer. The time is reckoned from the moment that the thermometer shows the right temperature. For small tins this is unnecessary.

I may add that whether my aforesaid theory is right or wrong, one thing is certain—viz., that the milk so treated will keep, and that result has not heretofore, to my knowledge, been obtained; and I have, moreover, done this with varying quantities of milk up to fifty liters. The time which the aforesaid process or alternating treatment takes varies slightly in accordance with the size of the vessels, and may, with the larger vessels, be performed in about nine hours. The temperatures given must, however, be adhered to, else the process is a failure.

In order quickly to bring the temperature down to 40°, the cooling-water must evidently be much colder than 40°, and when the temperature approaches the 40° I let steam into the heating-vessel until the temperatures in it and in the tins become alike. If I, for instance, heat from 40° to 70°, I accelerate this process by sending up the temperature in the heating-vessel to about 80°, and then regulate by means of the aforesaid thermometer; but with small tins the thermometer is superfluous, as the tins quickly acquire the same temperature as the liquid in which they are immersed in the heating-vessel.

By using milk-vessels with flat sides or ends, the expansion caused by increase of temperature is allowed for, and I also gain the important advantage that if an expansion should take place after the process is completed it would indicate that the process in that case, from some carelessness or accident, was a failure, because gas-pressure had been produced in the vessel, and I may thus reject such tins and prevent disappointment of the consumer.

Having fully described my invention, what I desire to claim and secure by Letters Patent is—

The herein-described process of preserving milk, which consists in first cooling the freshly-obtained milk to about 10° or 15° centigrade, then subjecting the same to the following treatment under occlusion of atmospheric air, to wit: first heating to about 70° centigrade for about one and three-quarters hour, then reducing the temperature to about 40° centigrade, and keeping same at that temperature for about the same period of time, and repeating this treatment, the last heating lasting for about one-half an hour, then subjecting the milk to a temperature of from 80° to 100° centigrade for about one-half an hour, and finally reducing the temperature to about 15° centigrade, substantially as and for the purpose specified.

KRISTIAN GERHARD DAHL.

Witnesses:
O. WINGE,
A. BÖDTKE.